Patented Jan. 22, 1946

2,393,574

UNITED STATES PATENT OFFICE 2,393,574

ALBINO ASPHALT EMULSION PAINT

Harry J. Sommer, Lafayette, Calif., assignor to Shell Development Company, San Francisco, Calif., a corporation of Delaware No Drawing. Application June 30, 1943, Serial No. 492,972

20 Claims. (Cl. 106—277)

The present invention relates to colored aqueous emulsions of albino asphalt (also known as petroleum plastics) suitable for painting purposes and pertains more particularly to albino asphalt emulsion paints of increased resistance to deterioration and to methods of making said improved emulsions.

Heretofore, it has been proposed to use colored albino asphalt emulsions as inexpensive paints for roofs, barns, etc., and particularly as camouflage paints. It may also be desirable to use these emulsions in making colored pavements, traffic stripes, etc. These emulsions have been prepared, for example, by mixing an aqueous albino asphalt emulsion, containing emulsifiers, such as casein, rosin soaps, alkalies, etc. and mixtures thereof, including free alkalies, with an aqueous dispersion of finely divided pigment and bentonite or the like. However, the albino asphalt emulsion paints prepared by previously proposed methods have been found to be unsatisfactory with regard to color fading, darkening of the albino asphalt binder, checking, cracking, general disintegration, etc.

It is therefore an object of this invention to provide a method of preparing a colored albino asphalt emulsion paint of improved characteristics, particularly with respect to fading and disintegration.

It is another object to provide a colored albino asphalt emulsion of increased resistance to color fading and darkening of the albino asphalt binder on exposure to ultra-violet light.

A further object of this invention is to provide a colored albino asphalt emulsion containing an additive dispersed in the albino asphalt prior to emulsification, which additive imparts fade resistance to the emulsion paint but does not adversely affect the emulsifiers or the emulsification.

The present invention comprises incorporating into the albino asphalt immediately before emulsification a small amount of a fade-inhibiting agent selected from the group consisting of sulfur and chlorine, emulsifying to form an albino asphalt-in-water emulsion with a small amount of soap, and incorporating a suitable pigment into the resultant emulsion.

The fade-inhibiting agent may be incorporated into the albino asphalt in any suitable manner. Usually from about 0.05% to 5% or more based on the albino asphalt of the fade-inhibiting agent is sufficient to obtain a paint of superior resistance to fading and general deterioration. After incorporation of the fade-inhibiting agent the asphalt is emulsified preferably as soon as possible to avoid discoloration of the albino asphalt. The higher the temperature of the asphalt after said addition the sooner the emulsification should take place. For example, at 300° F. emulsification should be performed within ½ hour. At 350° F. 10 minutes is too long before emulsification. Preferably, the albino asphalt is heated at 220° F. to 325° F., and emulsification carried out immediately, i. e. within ½ hour, after incorporation of the fade-inhibiting agent.

In the case of sulfur, powdered sulfur may be stirred into melted albino asphalt. However, it is preferable to melt both the sulfur and albino asphalt by heating, for example, to about 240° F. and to mix them in the liquid state. Preferably at least 0.5% and up to 2%, or more, of sulfur by weight based on the albino asphalt is used. It is important that the sulfur-containing albino asphalt not be overheated. Preferably, the asphalt is heated only enough to maintain it sufficiently liquid for incorporating the sulfur thereinto.

In the use of chlorine, a small amount of albino asphalt may be saturated or chlorinated with chlorine by bubbling chlorine through it and thereafter mixing the melted chlorine-containing albino asphalt with melted straight albino asphalt to obtain the desired chlorine content. Preferably, when using chlorine as the fade-inhibiting agent at least 0.05% but usually less than 1%, based on the weight of the albino asphalt of chlorine is required.

Also suitable as fade-inhibiting agents are mixtures of sulfur and chlorine as well as sulfochlorides, such as sulfur monochloride, thionyl chloride, sulfuryl chloride, etc.

Suitable soaps for the emulsification of the treated albino asphalt include, for example, alkali metal and alkaline earth metal as well as ammonium soaps of oil soluble detergent-forming acids, such as higher fatty acids, i. e. acids that have at least 8 carbon atoms in the molecule, for example, abietic acid, melissic acid, lauric, myristic, palmitic, stearic acid, undecylenic acid, oleic acid, ricinoleic acid, polyricinoleic acid, ricinostearolic acid, acetyl-ricinoleic acid, linoleic acid, linolenic acid, mixtures of any two or more of the above mentioned acids or other acids; mixed higher fatty acids derived from animal or vegetable sources, for example, tall oil, cocoanut oil, rapeseed oil, palm kernel oil, corn oil, cottonseed oil, sardine oil, soyabean oil, peanut oil, seal oils, teaseed oil; partially or completely hydrogenated animal and vegetable oils; naturally-occurring petroleum acids, such as naphthenic acids, and carboxy acids produced by the oxidation of petroleum, of paraffin wax, etc.; sulfonic acids, such as mahogany acids; sulfate ester acids, etc.

The range of concentration of the emulsifying soap or other such agent depends on the nature thereof but in general may be from about 0.5% to 5% or more of the aqueous phase of the emulsion. As is known, it is preferable that in the neutralization of the above-suggested acids with alkali metal, alkaline earth metal or ammonium hydroxide, a slight excess of the hydroxide can be used in order to keep the aqueous phase well over on the alkaline side.

Suitable pigments include, for example, iron oxide red, chromium oxide green, yellow ochre, cadmium yellow, raw umber, ultramarine blue, cobalt blue, titanium oxide, sublimed white lead, lithopone, metallic bronzes (e. g. copper, brass, aluminum, iron, etc.), and mixtures of the foregoing. Preferably the pigments are dispersed in water with the aid of a suspending agent, such as a highly swellable or colloidal substance, e. g. bentonite, and this dispersion then admixed with the aqueous albino asphalt emulsion. However, it is sometimes desirous to incorporate the pigment in the emulsion by adding the dry pigment to the emulsion and then milling the resultant colored emulsion.

As is known, albino asphalts can be obtained from most asphaltic and mixed base crude oils by solvent extraction and distillation methods, such as those set out in U. S. patents of Merrill 2,081,496, Crawley 2,114,796, Anderson 2,201,466, Anderson 2,231,419, and Anderson Reissue 22,093.

Albino asphalts are characterized by their plasticity, translucency, freedom of asphaltenes, and complete solubility in light naphtha. At least two types may be distinguished according to their solubility in acetone, one type being soluble at 77° F. in an equal volume of acetone and the other being substantially insoluble. In many instances, the acetone-insoluble type albino asphalts are preferred, since they have a lower temperature susceptibility and lower solubility in organic solvents and therefore can be used under a greater range of conditions.

Other asphalts, although not strictly albino asphalts, may be used if they are of sufficiently light color that they can be pigmented to the extent that they present a light-colored surface.

A colored albino asphalt emulsion when prepared according to the above described method of the present invention has a composition comprising 19 to 30% and preferably 15% to 25% by weight of albino asphalt, which contains from 0.05% to 5% by weight (based on the asphalt) of the fade-inhibiting agent, i. e. chlorine or sulfur, 15% to 35% by weight of a pigment, 0.5% to 5% by weight of bentonite or the like, 0.2% to 3% by weight of an emulsifier, and the remainder being water. (All the percentages are based on the total weight of the finished emulsion except where noted.)

As illustrative of a preferred embodiment of the method of the present invention, the following example is given. Into a quantity of melted albino asphalt having a R and B softening point of 99° F. and a penetration of 130 at 77° F. was incorporated by stirring about 1% by weight of melted sulfur and 1% of mixed $C_{14}$–$C_{20}$ fatty acids. Immediately after the sulfur became thoroughly dispersed in the melted albino asphalt, the sulfur-containing asphalt and an aqueous solution of 1.5% casein and 0.3% potassium hydroxide were passed through a colloid mill to obtain an albino asphalt-in-water emulsion in a ratio of 40% emulsifier solution and 60% albino asphalt. An aqueous dispersion of drab pigment consisting of ferric oxide and calcium carbonate and bentonite was prepared and passed through a colloid mill to obtain better dispersion. To this pigment dispersion was added with stirring the above-described sulfur-containing albino asphalt emulsion. The resultant paint had the following composition: 16% by weight of albino asphalt, which contained about 1% by weight of the asphalt of free sulfur, 1.6% by weight of bentonite, 26.4% by weight of drab pigment, and the remainder water and emulsifiers.

In a similar manner another colored albino asphalt emulsion paint was made by using chlorine-containing albino asphalt prepared by blending straight albino asphalt with some chlorinated albino asphalt to give a concentration of about 0.1% of chlorine in the albino asphalt.

Colored albino asphalt emulsions prepared according to the present invention, including samples of the above-described examples were tested by painting panels, allowing them to dry, and placing the painted panels in a Weather-Ometer, wherein the painted surfaces are subjected alternately to ultraviolet from an arc light at 140° F. and to driving rain. Also included for comparison were some panels painted with colored albino asphalt emulsions prepared in the same manner but without the addition of a fade-inhibiting agent, i. e. sulfur or chlorine. All the painted panels were exposed to the action of the Weather-Ometer for the same length of time, i. e. 120 hours of arc light and 12 hours of rain, at the end of which the painted surfaces on the panels were inspected for fading, smoothness of surface, and general disintegration. In all cases the surfaces painted with the heretofore-proposed albino asphalt emulsions were faded in pigment coloring, became checked or crazed in appearance with cracks running through the paint film, and covered with flakes of hard and non-cohesive material which could be easily removed. On the other hand, the surfaces painted with the albino asphalt emulsions of the present invention had faded very little, if any, and were smooth and substantially uncrazed in appearance.

I claim as my invention:

1. In a method of preparing colored albino asphalt aqueous emulsions, the step of incorporating into the albino asphalt immediately prior to emulsification about 0.05% to 5%, based on the weight of the albino asphalt, of a fade inhibiting agent selected from the group consisting of sulfur and chlorine.

2. In a method of preparing colored albino asphalt aqueous emulsions, the steps of heating the albino asphalt to 220° F. to 325° F., and incorporating into the albino asphalt immediately prior to emulsification about 0.05% to 5% based on the weight of the albino asphalt of a fade-inhibiting agent selected from the group consisting of sulfur and chlorine.

3. In a method of preparing colored albino asphalt aqueous emulsions, the steps of incorporating into the albino asphalt about 0.05% to 5%, based on the weight of the albino asphalt, of a fade inhibiting agent selected from the group consisting of sulfur and chlorine, and emulsifying said treated albino asphalt within one-half hour.

4. In a method of preparing colored albino asphalt aqueous emulsions, the steps of heating the albino asphalt to 220° F. to 325° F., incorporating into the albino asphalt about 0.05% to 5%, based on the weight of the albino asphalt, of a fade inhibiting agent selected from the group consisting of sulfur and chlorine, and emulsifying said treated albino asphalt within one-half hour.

5. In a method of preparing colored albino asphalt aqueous emulsions, the step of incorporating into the albino asphalt immediately prior to emulsification about 0.05% to 5% of free sulfur.

6. In a method of preparing colored albino asphalt aqueous emulsions, the step of incorporating into the albino asphalt immediately prior to emulsification about 0.5% to 2% of free sulfur.

7. In a method of preparing colored albino asphalt aqueous emulsions, the steps of heating the albino asphalt just sufficiently to maintain it in a liquid state, incorporating about 0.05% to 5% of free sulfur into said liquid albino asphalt, and immediately thereafter emulsifying said sulfur-containing albino asphalt in water.

8. In a method of preparing colored albino asphalt aqueous emulsions, the steps of heating the albino asphalt just sufficiently to maintain it in a liquid state, incorporating about 0.05% to 5% of melted sulfur into said liquid albino asphalt, and immediately thereafter emulsifying said sulfur-containing albino asphalt in water.

9. In a method of preparing colored albino asphalt aqueous emulsions, the step of incorporating into the albino asphalt immediately prior to emulsification about 0.05% to 5% of chlorine.

10. In a method of preparing colored albino asphalt aqueous emulsions, the step of incorporating into the albino asphalt immediately prior to emulsification 0.05% to 1.0%, based on the weight of the albino asphalt, of chlorine.

11. In a method of preparing colored albino asphalt aqueous emulsions, the steps of chlorinating an albino asphalt, blending the resultant chlorinated asphalt with straight albino asphalt to obtain a mixture containing about 0.05% to 5% of chlorine and immediately thereafter emulsifying said chlorine-containing albino asphalt blend in water.

12. In a method of preparing colored albino asphalt aqueous emulsions, the steps of incorporating about 0.05% to 5%, based on the weight of the albino asphalt, of a fade inhibiting agent chosen from the group consisting of chlorine and sulfur, immediately thereafter emulsifying said treated albino asphalt, and incorporating a finely divided pigment into the resultant emulsion.

13. In a method of preparing colored albino asphalt aqueous emulsions, the steps of incorporating about 0.05% to 5%, based on the weight of the albino asphalt, of a fade inhibiting agent chosen from the group consisting of chlorine and sulfur, immediately thereafter emulsifying said treated albino asphalt, and mixing with the resultant emulsion an aqueous dispersion of finely-divided pigment and from 0.5% to 5% by weight based on the ultimate colored albino asphalt emulsion of a finely divided highly colloidal mineral suspending agent.

14. In a method of preparing colored albino asphalt aqueous emulsions, the steps of incorporating about 0.05% to 5%, based on the weight of the albino asphalt, of a fade inhibiting agent chosen from the group consisting of chlorine and sulfur, immediately thereafter emulsifying said treated albino asphalt, and mixing with the resultant emulsion an aqueous dispersion of finely-divided pigment and from 0.5% to 5% by weight, based on the ultimate colored albino asphalt emulsion, of bentonite.

15. An aqueous colored albino asphalt emulsion comprising 10% to 30% albino asphalt, which contains from 0.05% to 5% by weight based on the asphalt, of a fade-inhibiting agent selected from the group consisting of sulfur and chlorine, finely-divided pigment, an emulsifying amount of an emulsifier, and water.

16. An aqueous colored albino asphalt emulsion comprising 10% to 30% albino asphalt, which contains from 0.05% to 5% by weight based on the asphalt, of a fade-inhibiting agent selected from the group consisting of sulfur and chlorine, finely-divided pigment, 0.5% to 5% by weight of a finely-divided highly coloidal mineral suspending agent, 0.5% to 5%, based on the aqueous phase of the emulsion of an emulsifier, and water.

17. An aqueous colored albino asphalt emulsion comprising 10% to 30% albino asphalt, which contains from 0.05% to 5% by weight based on the asphalt, of a fade-inhibiting agent selected from the group consisting of sulfur and chlorine, finely-divided pigment, 0.5% to 5% by weight of finely-divided bentonite, an emulsifying amount of an emulsifier, and water.

18. An aqueous colored albino asphalt emulsion comprising 10% to 30% albino asphalt, which contains from 0.05% to 5% by weight based on the asphalt, of a fade-inhibiting agent selected from the group consisting of sulfur and chlorine, 15% to 35% by weight of finely-divided pigment, an emulsifying amount of an emulsifier, and water.

19. An aqueous colored albino asphalt emulsion comprising 10% to 30% albino asphalt, which contains from 0.05% to 5% by weight, based on the asphalt, of sulfur, finely-divided pigment, 0.5% to 5%, based on the aqueous phase of the emulsion of an emulsifier, and water.

20. An aqueous colored albino asphalt emulsion comprising 10% to 30% albino asphalt, which contains from 0.05% to 5% by weight, based on the asphalt, of chlorine, finely-divided pigment, 0.5% to 5%, based on the aqueous phase of the emulsion of an emulsifier, and water.

HARRY J. SOMMER.